United States Patent [19]

Takeda

[11] Patent Number: 5,790,494
[45] Date of Patent: Aug. 4, 1998

[54] DIGITAL AUDIO RECORDER AND DIGITAL AUDIO RECORDING AND REPRODUCING SYSTEM

[75] Inventor: Minoru Takeda, Tokyo, Japan

[73] Assignee: Nippon Precision Circuits Inc., Tokyo, Japan

[21] Appl. No.: 536,297

[22] Filed: Sep. 29, 1995

[30] Foreign Application Priority Data

Sep. 30, 1994 [JP] Japan .................................. 6-237061

[51] Int. Cl.$^6$ .................................................. G11B 7/00
[52] U.S. Cl. ........................................... 369/59; 369/124
[58] Field of Search .................................. 369/59, 47, 49, 369/48, 60, 124

[56] References Cited

U.S. PATENT DOCUMENTS 4,990,848  2/1991  So ........................................ 324/76.41
5,239,598  8/1993  Wight et al. ............................. 385/8

*Primary Examiner*—Nabil Hindi
*Attorney, Agent, or Firm*—Jordan and Hamburg

[57] ABSTRACT

A digital audio recorder and system efficiently increases a sampling frequency and a number of bits of a digital audio recording. The digital audio system has a frequency analyzer receives a first digital waveform data having a sampling frequency fs1 and N1 number of bits and determining a sampling frequency fs2 in accordance with a highest frequency component of the first digital waveform data. A delay device delays the first digital waveform data a time period equal to the time required for the frequency analyzer to determine the highest frequency component and then sends the first digitial waveform data to a frequency converter. The frequency converter converts the first digital waveform data to a second digital waveform data having the sampling frequency fs2 and a number of bits N2. A bit number converter converts the second digital waveform data to a third digital waveform data having a sampling frequency fs2 and a number of bits N3 determined in response to variation in the sampling frequency fs2 such that the product of fs2 and N3 is constant. A memory device stores the third digital waveform data.

6 Claims, 2 Drawing Sheets

F I G. 2
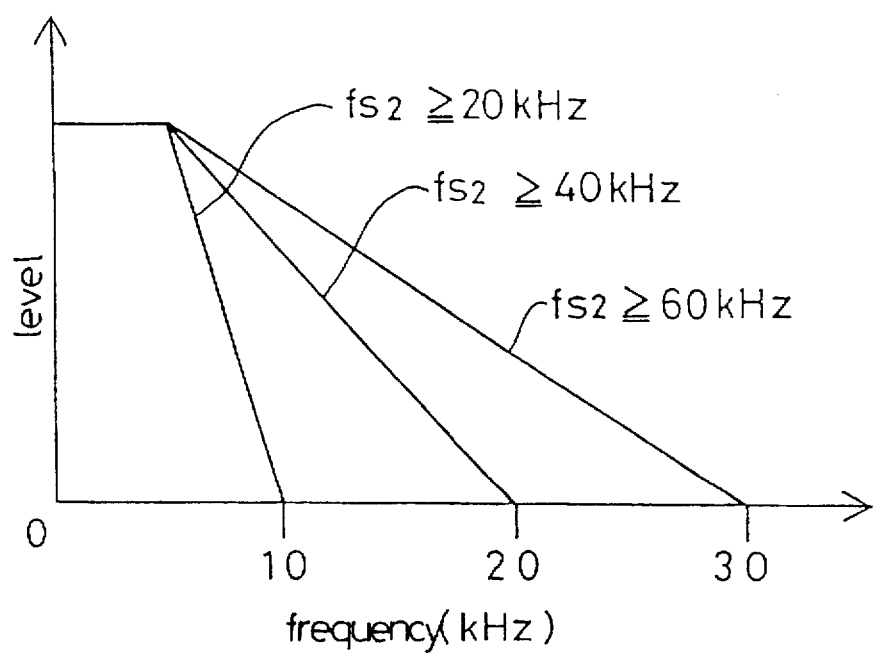

DIGITAL AUDIO RECORDER AND DIGITAL AUDIO RECORDING AND REPRODUCING SYSTEM

BACKGROUND OF THE INVENTION

The present invention relates to a digital audio recorder and a digital audio recording and reproducing system.

Recording media for digital audio signals includes CDs (Compact Disks) and DATs (Digital Audio Tapes), etc. Signals for digital audio recording are PCM signals having sampling frequencies and numbers of bits specified by the industry standard. The specified sampling frequencies and the numbers of bits are 44.1 kHz and 16 bits for CDs, and 48.0 kHz and 44.1 kHz and 16 bits or 32.0 kHz and 12 bits for DATs, respectively.

The sampling frequencies are selected to be in the range of 32 kHz to 48 kHz based on Nyquist's sampling theorem which requires that the A/D conversion be performed at a sampling frequency two or more times the maximum audible frequency of human hearing (about 20 kHz). Meanwhile, the numbers of bits for digital audio signals are determined by the industry standard for CDs which requires about 16 bits (about 98 db in dynamic range) for high fidelity audio signals. In such cases, the sampling frequencies and the numbers of bits are fixed for the recording media or the mode of each sampling frequency.

Certain DAT recorders execute A/D conversion at a sampling frequency two times the originally specified 48.0 kHz, namely 96 kHz to record the data at a doubled speed. Here, the sampling frequency and the number of bits are also fixed.

In recently developed DCCs (Digital Compact Cassettes) or MDs (Mini-Discs), the A/D converted audio signals are further compressed down to from ¼ to ⅕ to be recorded utilizing sub-band coding or DCT (Discrete Cosine Transformation), etc. The sampling frequencies and the numbers of bits are also fixed in these applications.

High fidelity audio engineering efforts are presently focused on increasing the sampling frequencies or numbers of bits of CDs or DATs. One direction of the efforts is exemplified by the above described DAT recorders in which the sampling frequency is increased up to 96 kHz. Another direction is exemplified by efforts to produce DAT recorders in which the number of bits is increased up to 20 bits while leaving the sampling frequency at 48.0 kHz.

In the above systems only one of the sampling frequency or the number of bits is increased, but both are not increased concurrently. Increasing both the sampling frequencies and the numbers of bits increases a burden on the media and the hardware of recording or reproducing systems.

Accordingly, an object of the present invention is to provide a digital audio recorder and a digital audio recording and reproducing system which are able to minimize an increase in the burden on the hardware while efficiently increasing the sampling frequency and the number of bits.

SUMMARY OF THE INVENTION

Recent developments in digital signal processing technology and LSI technology have enabled sampling frequencies of digital recordings to be freely changed without converting the digital signal into an analogue signal as in commercially available asynchronous sampling frequency converters (sampling rate converters) exemplified by the SM5844AF from the NIPPON PRECISION CIRCUITS or the AD1890 from the ANALOG DEVICES.

Frequencies of the musical sounds recorded as digital signals on media such as CDs or DATs may be higher or lower than half of the sampling frequency (Nyquist frequency) depending upon the kinds of musical instruments or human voices involved. A musical sound including frequencies higher than the Nyquist frequency (recording band) is preferably recorded with further increased sampling frequency in order to record the original sound with fidelity, while a musical sound including frequencies lower than the Nyquist frequency (recording band) can be recorded without problems with a lowered sampling frequency.

Accordingly, the present invention operates to record original sound having an increased highest frequency component at an increased sampling frequency with the number of bits reduced in accordance with the increase in frequency, and conversely, the sampling frequency is decreased with the number of bits increased in accordance with a decrease in frequency of the original sound, presenting a lowered highest frequency component. Thus, the sampling frequency and the number of bits can be efficiently increased in a single recording. Using the above mentioned asynchronous sampling frequency converter (sampling rate converter), the sampling frequency can be freely changed to allow the sampling frequency to adaptively (flexibly) vary in response to the upper frequency component of the original sound.

BRIEF DESCRIPTION OF THE DRAWINGS

The present invention will be explained with reference to the figures wherein:

FIG. 2 is a graph detailing operation of the embodiment of FIG. 1.

DETAILED DESCRIPTION OF THE PREFERED EMBODIMENT

Figure 1:
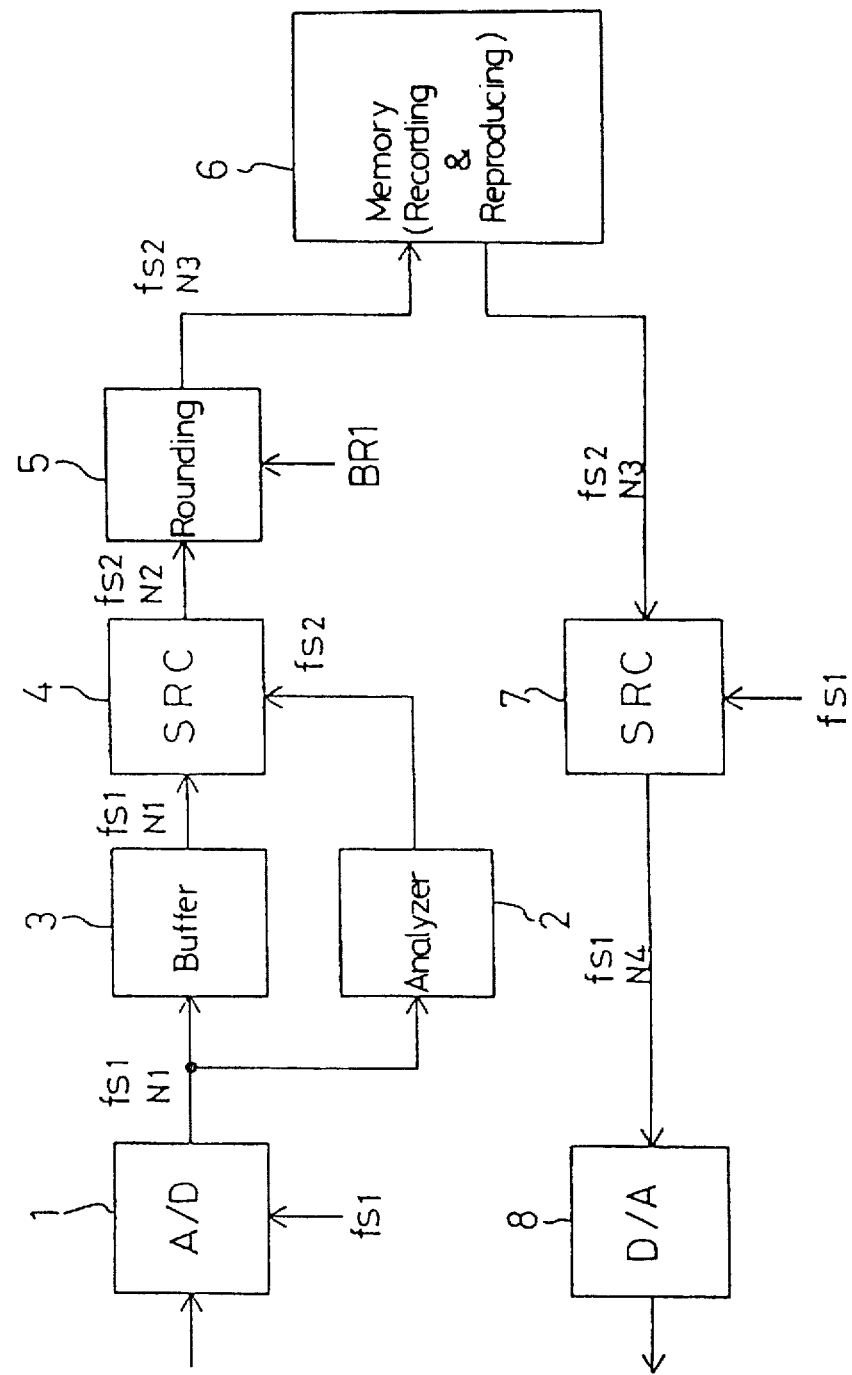
FIG. 1 is a block diagram showing an embodiment, a digital recording and reproducing system of the present invention.

An A/D converter 1 receives and converts an analogue audio signal to a first digital audio signal having a sampling frequency fs1 (fixed) and a number of bits N1 (fixed).

A frequency analyzer 2 analyzes the frequency spectrum of the first digital audio signal from the A/D converter 1 to identify the highest frequency component of the signal and outputs a sampling signal having, a frequency fs2 which is equal to twice the highest frequency component.

A buffer 3 receives the first digital audio signal from the A/D converter and delays the signal a delay period equivalent to a response time of the frequency analyzer 2.

A sampling rate converter 4 receives the first digital audio signal having the sampling frequency fs1 and the number of bits N1 from the buffer 3 and adaptively converts the first signal to a second digital audio signal having a sampling frequency fs2 (variable) and a number of bits N2 (fixed) in response to the sampling signal from the frequency analyzer 2 having the frequency fs2.

A rounding arithmetic unit 5 receives the second digital audio signal from the sampling rate converter 4 and adaptively (flexibly) converts and outputs a third digital audio signal having a sampling frequency fs2 and a number of bits N3 (variable) where a bit rate fs2·N3 is equal to a constant value BR1.

A memory section 6 stores the third digital audio signal at the sampling frequency fs2 and with the number of bits N2 output from the rounding arithmetic unit 5.

A sampling rate converter 7 receives the third digital audio signal from the memory section 6 and outputs a fourth digital audio signal having a sampling frequency fs1 (fixed) and a number of bits N4 (fixed). A D/A converter 8 receives and converts the fourth digital audio signal, from the sampling rate converter 7, to an analogue audio signal.

During operation an analogue audio signal is applied to the A/D converter 1 and A/D converted at a sampling frequency fs1 about two time (e.g. 96 kHz) as high as the conventional sampling frequency. The converted number of bits N1 is 20, or in the range thereof, which is larger than the conventional number of bits (e.g. 16 bits).

The A/D converted first digital audio signal, having the sampling frequency fs1 and number of bits N1, is analyzed by the frequency analyzer 2 to determine the highest frequency component. The frequency analysis results are characterized by graphs in FIG. 2 in which the highest frequency components are shown as 10 kHz, 20 kHz and 30 kHz. The frequency analyzer 2 adaptively (flexibly) outputs the sampling signal at a frequency twice the highest frequency component detected by the frequency analyzer 2.

Meanwhile, the first digital audio signal from the A/D converter 1 is also applied to the buffer 3. The first digital audio signal is delayed a time period equivalent to the time delay of the analyzing operation in the frequency analyzer 2 and outputted with the same sampling frequency fs1 and the same number of bits N1, as originally generated.

The digital audio signal from the buffer 3 is applied to the sampling rate converter 4 and is converted to the second digital audio signal which has a sampling frequency fs2 (variable) and a number of bits N2 (fixed). The sampling frequency fs1 is adaptively (flexibly) converted to fs2 in response to receiving the sampling signal having the converted sampling frequency fs2 from the frequency analyzer 2. The number of bits N2 after the conversion is usually made to be larger than the number of bits N1 before the conversion to reduce requantization noise generated in a digital filtering operation at the conversion.

The bit rate of the second digital audio signal produced by the sampling rate converter 4 is defined as fs2·N2, which adaptively (flexibly) varies in response to the variation in the sampling frequency fs2. Hence, directly storing the sampling frequency fs2 and the number of bits N2 in the memory section 6 would increase the burden on the memory section 6, i.e. the hardware in the recording system. To eliminate the requirement for increased capacity, the rounding arithmetic unit 5 processes the second digital audio signal to produce the third digital audio signal at the sampling frequency fs2 with N3 bits at a fixed bit rate BR1, where the number of bits N3 is expressed as N3=BR1/fs2. Since the bit rate BR1 is fixed and the sampling frequency fs2 remains unchanged, then the number of bits N3 is rounded in response to the variation in the sampling frequency fs2.

The third digital audio signal from the rounding arithmetic unit 5 is sequentially stored (recorded) in the memory section 6, completing the recording operation.

A reproduction operation begins with retrieving and converting the third digital audio signal having the sampling frequency fs2 and N3, from the memory section 6, to the fourth digital audio signal having a sampling frequency fs1 (fixed) and a number of bits N4 (fixed) by a sampling rate converter 7. The number of bits N4 is usually larger than the number of bits N1. The digital audio signal after the conversion is D/A converted to an analogue audio signal by a D/A converter 8, thus completing the reproduction.

The present invention enables operations to increase the sampling frequency with a decrease in the number of bits where an original sound has high highest frequency component, and conversely, to decrease the sampling frequency with an increase in the number of bits for original sound having a low highest frequency component, whereby the sampling frequency and the number of bits can be efficiently increased with a minimized increase in the burden on the hardware.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital audio recorder comprising:

frequency analyzing means for analyzing a frequency spectrum of first digital waveform data, sampled at a first sampling frequency and having a first number of bits, and determining a highest frequency component and a second sampling frequency in accordance with said highest frequency component of said first digital waveform data;

a delay means for delaying said first digital waveform data in accordance with an analyzing time required by said frequency analyzing means for determining said highest frequency component;

frequency conversion means for converting said first digital waveform data from said delay means to second digital waveform data having said second sampling frequency and a second number of bits in response to receiving said second sampling frequency from said frequency analyzing means; and bit number conversion means for converting said second digital waveform data to third digital waveform data having said second sampling frequency and a third number of bits determined in response to variation in said second sampling frequency such that a product of said second sampling frequency and said third number of bits remains equal to a constant; and said third digital waveform data being used as a data for sound recording.

2. A digital audio recorder according to claim 1 further comprising a memory means for adaptively storing said third digital waveform data in response to the variation in said second sampling frequency.

3. The digital audio recorder according to claim 2 wherein said second sampling frequency is one of equal to and greater than twice said highest frequency component of said first digital waveform data.

4. The digital audio recorder according to claim 1 wherein said second sampling frequency is one of equal to and greater than twice said highest frequency component of said first digital waveform data.

5. A digital audio recording and reproducing system comprising:

frequency analyzing means for analyzing first digital waveform data having a first sampling frequency and a first number of bits and determining a second sampling frequency in accordance with a highest frequency component of said first digital waveform data;

delay means for delaying said first digital waveform data in accordance with an analyzing time period required by said frequency analyzing means;

first frequency conversion means for converting said first digital waveform data, received from said delay means, to second digital waveform data having said second sampling frequency and a second number of bits in response to receipt of said second sampling frequency from said frequency analyzing means;

bit number conversion means for converting said second digital waveform data to third digital waveform data having said second sampling frequency and a third number of bits determined in response to variation in said second sampling frequency such that a product of said second sampling frequency and said third number of bits remains equal to a constant;

a memory means for adaptively storing said third digital waveform data in response to the variation in said second sampling frequency; and second frequency conversion means for retrieving said third digital waveform data from said memory means and converting said third digital waveform data to a fourth digital waveform data having said first sampling frequency and a fourth number of bits.

6. The digital audio recorder according to claim 5 wherein said second sampling frequency is one of equal to and greater than twice said highest frequency component of said first digital waveform data.

* * * * *